Nov. 24, 1936.      E. K. LINCOLN      2,061,664
SANITARY CREPE RUBBER CUSHION
Filed Dec. 16, 1935
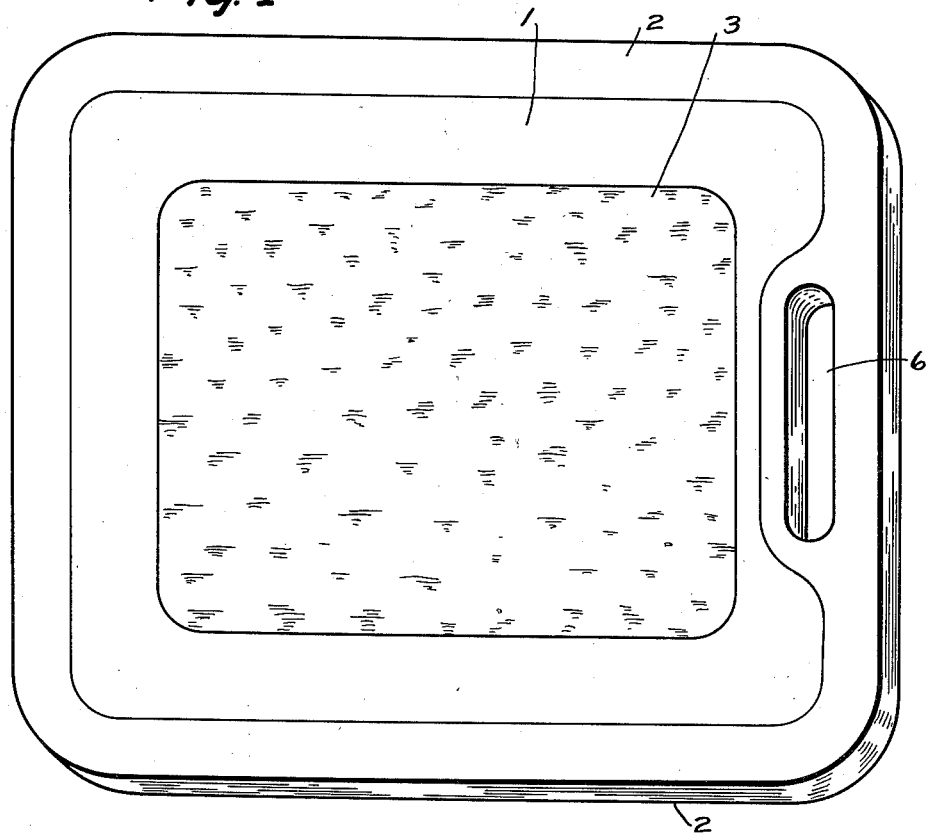
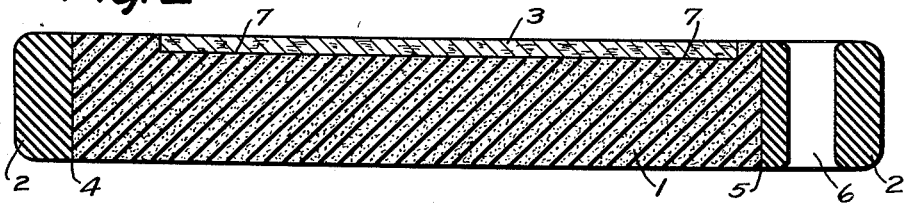
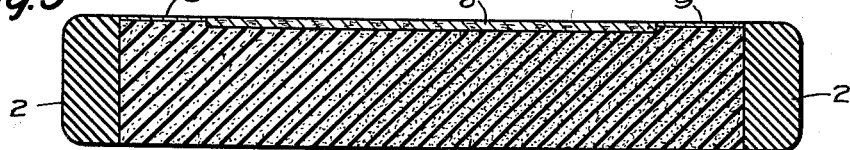
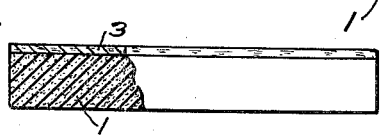
INVENTOR.
Edward K. Lincoln
BY
ATTORNEY.

Patented Nov. 24, 1936

2,061,664

UNITED STATES PATENT OFFICE 2,061,664

SANITARY CREPE RUBBER CUSHION

Edward K. Lincoln, Fairfield, Conn.

Application December 16, 1935, Serial No. 54,702

3 Claims. (Cl. 155—182)

The purpose of this invention is to provide a dry sanitary comfortable seat pad that is particularly adapted for outdoor use, such as athletic games, to guard against discomforts and disease, such as hemorrhoids caused by contact with damp cold surfaces; which may readily be carried by hand and which can also be used indoors on chairs, benches or the like.

The invention is a cushion or pad formed of relatively thick crepe rubber with a cork insert in the upper surface forming the actual seat and with a border of rubber, or the like, that is comparatively firm, and in which a handle opening is provided in the border.

Relatively thin seat pads or cushions have been made of sponge rubber and these have been faced with velour, felt, or a suitable material and whereas these are satisfactory for use in chairs or other indoor uses they are not satisfactory for outdoor use and particularly for cold, damp seats where a relatively thick sponge rubber base is desired and where it is also preferable to provide a cork pad insert to form the actual seat.

The object of this invention is therefore to provide a cushion that is adapted for outdoor use such as benches in athletic fields which is of sufficient thickness to insure insulation between the body and seat.

Another object is to provide a seat pad or cushion having a relatively stiff cork layer mounted upon a resilient base.

Another object is to provide a cushion adapted for seats for outdoor use which has a handle by which it may be carried.

A further object is to provide means for mounting a cork panel in a resilient base in order to provide a cork seat that has sufficient resiliency to be comfortable.

And a still further object is to provide a cushion having a cork pad in combination with a crepe rubber base which is of a simple and economical construction.

With these ends in view the invention embodies a crepe rubber cushion of sufficient size to be used as a seat pad which is about two inches thick and which is provided with a continuous border of more solid or firm rubber with a handle opening in the board and in which a cork layer forming the contacting seat is recessed in the upper surface.

Other features and advantages of the invention will appear from the following description taken in connection with the drawing, wherein:

Figure 1 shows a plan view of the cushion.

Figure 2 is a longitudinal section through the cushion.

Figure 3 is a cross section through the cushion showing an alternate design in which the cork pad is relatively thin and in which the surrounding portions of the crepe rubber between the cork and border are covered with a felt or suitable covering.

Figure 4 is a side view with part broken away showing another alternate arrangement in which the binding is omitted, and the cork layer extended over the entire upper surface of the cushion.

In the drawing the cushion is shown as it may be made wherein numeral 1 indicates the body of the cushion, numeral 2 the border, and numeral 3 the cork pad or layer.

The part 1 is preferably made of crepe or sponge rubber and while it is preferred to make the cushion about 11½ by 13½ inches, by 2 inches thick, it will be understood that it may be made of any size, shape or design, and of any thickness, and any suitable border or binding may be used, or the binding may be omitted leaving a raw edge.

The border 2, which is of a firmer, or more solid rubber, or other material, is shown extending continuously around the edge of the cushion and this is cemented or vulcanized to the edge of the part 1 as shown at the points 4 and 5. This border is provided with an opening 6, through which the fingers of the hand may be placed, thereby forming a handle to facilitate carrying.

The upper surface of the cushion 1 is formed with a recess or indentation 7 which, in the design shown in Figure 2, is about ¼ of an inch deep and the cork sheet 3 is cemented in the recess. In Figure 3 the cork sheet, which is indicated by the numeral 8, is shown relatively thin, and it will be understood that it may be of any thickness. It will also be understood that it may be extended continuously across the upper surface of the cushion as shown in Figure 4, in which the reinforcing border is also omitted. In the design shown in Figure 3 the upper surface of the part 1 between the cork and border is provided with a covering 9 which may be felt, velour, or any suitable material and this covering may be of any thickness desired.

It will be understood that other changes may be made in the construction of the device without departing from the spirit of the invention. One of which changes may be in the use of a cork panel or pad of any other design, another may be in the use of an insert of any other material instead of cork, and still another may be in the use of an opening of any other design instead of the handle opening by which the cushion may be carried.

The construction will be readily understood from the foregoing description. In use the cushion may be supplied as shown and described and it may be used on a chair, bench or the like indoors or it may be carried by hand or in an automobile to an athletic field or stand or on a picnic and the shape and size make it convenient to carry and also to use. In use the cushion may be placed upon a bench or flat surface with the cork upward so that the cork will form the seat surface and it will therefore be comfortable and at the same time impervious to moisture so that one may be assured of a clean, dry and comfortable seat.

The value of cork as a seat, and particularly a seat of this nature, is obvious, and the cork pad or layer is therefore, very essential, and it will be understood that it may be inserted or extended over the entire upper surface as shown in Figure 4, or arranged in any manner, and any resilient backing may be used to give the cork resiliency, and the backing may be attached to the cork in any manner.

Having thus fully described the invention, what I claim as new and desire to secure by Letters Patent, is:

1. A cushion comprising a relatively porous rubber pad of substantial thickness having a recess in the upper surface, a relatively stiff nonabsorbent pad in said recess, and a re-inforcing binding extending continuously around said rubber pad, said binding having an opening therein through which the fingers of the hand may be placed forming a handle.

2. A cushion comprising a relatively porous rubber pad of substantial thickness having a recess in the upper surface, a relatively stiff nonabsorbent pad in said recess, and a reinforcing binding extending continuously around said rubber pad.

3. A cushion as described in claim 2 characterized by a relatively thin felt covering on the exposed surface of the rubber pad and extending from the edge of the recess to the binding.

EDWARD K. LINCOLN.